United States Patent [19]

Haworth

[11] Patent Number: 5,180,182
[45] Date of Patent: Jan. 19, 1993

[54] TRAILER HITCH ALIGNMENT DEVICE

[76] Inventor: James R. Haworth, 7818 East Bay Dr., North Bend, Oreg. 97459

[21] Appl. No.: 749,985

[22] Filed: Aug. 26, 1991

[51] Int. Cl.⁵ .......................... B60D 1/36; G02B 5/08
[52] U.S. Cl. .................................... 280/477; 359/844; 359/872; 33/264
[58] Field of Search ............... 280/477; 359/841, 843, 359/844, 872, 871; 33/264

[56] References Cited

U.S. PATENT DOCUMENTS

| | | | |
|---|---|---|---|
| 3,332,731 | 7/1967 | Penk | 359/872 |
| 3,524,701 | 8/1970 | Strohmeier | 359/871 |
| 3,533,681 | 10/1970 | Glaser | 359/844 |
| 3,858,966 | 1/1975 | Lowell, Jr. | 359/881 |
| 4,163,606 | 8/1979 | Granno | 359/881 |
| 4,469,405 | 9/1984 | Chin-Wun | 359/841 |
| 4,552,376 | 11/1985 | Lofer | 280/477 |
| 4,905,376 | 3/1990 | Neely | 33/264 |
| 4,951,913 | 8/1990 | Quesada | 359/844 X |
| 5,059,016 | 10/1991 | Lawassani et al. | 359/844 X |
| 5,111,342 | 5/1992 | Quesada | 359/872 |

Primary Examiner—Margaret A. Focarino
Assistant Examiner—C. Mattix
Attorney, Agent, or Firm—John F. Ingman

[57] ABSTRACT

The trailer hitch alignment device includes a base member upon which a convex mirror is fixed. Two side members are hingedly attached to opposing edges of the base member so as to fold in sequence across the mirror in the closed position or to expose the mirror in the open position. The side members each have an angled slot, formed in the edge opposing the hinged edge. With the side members in the opened position, the angled slots are aligned to readily engage the top edge of a closed towing vehicle tailgate so as to support the base member and mirror in a position enabling observation from the driver's position of the relative movement of the towing hitch to the coupling of the towed vehicle. In the open position, the side members will open through an obtuse angle to a position limited by a stop formed on the hinge edge of the side members.

10 Claims, 3 Drawing Sheets

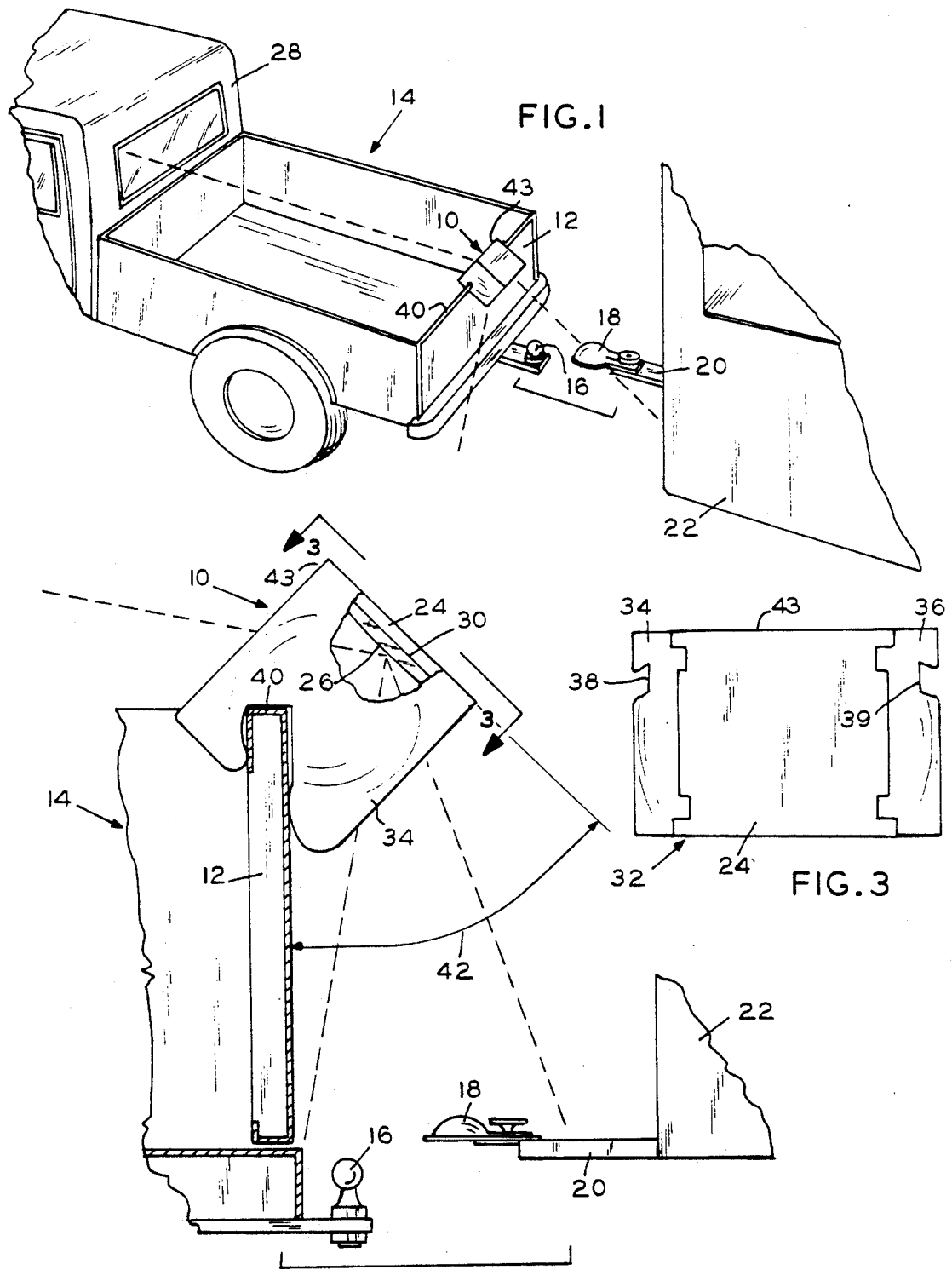

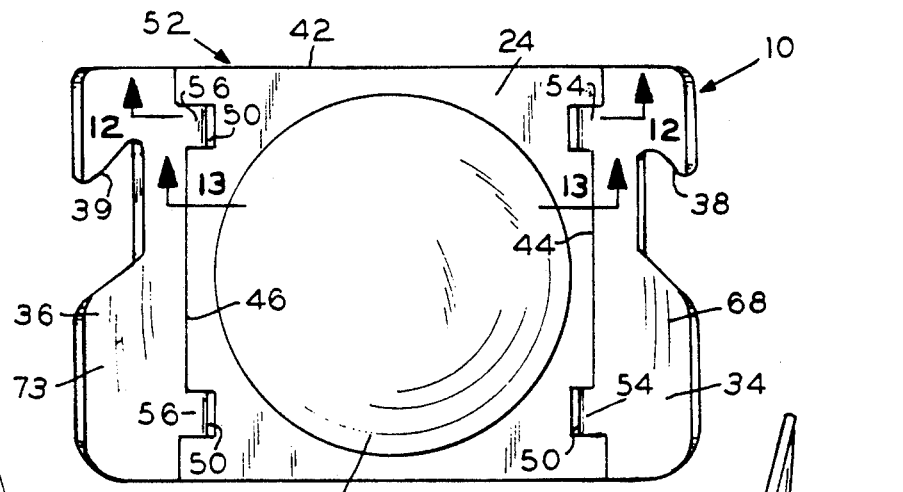
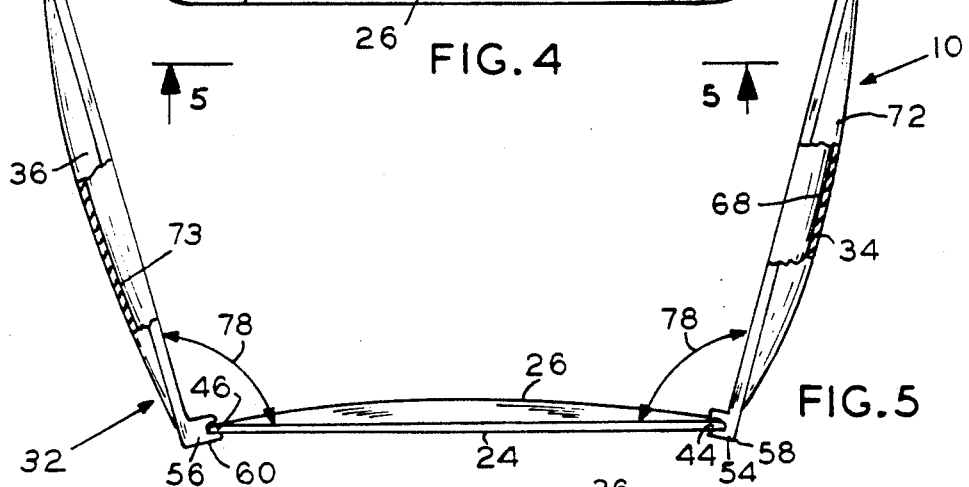
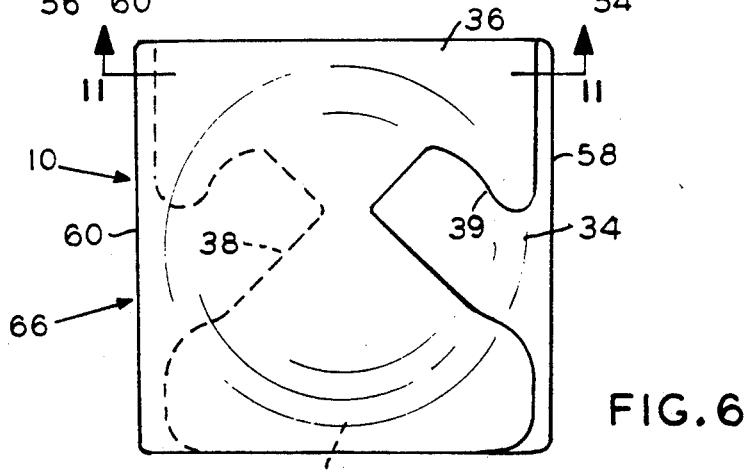
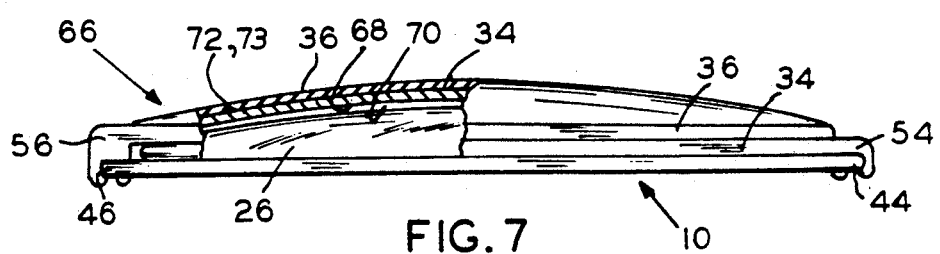

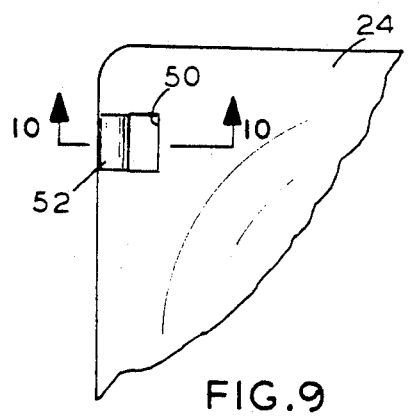
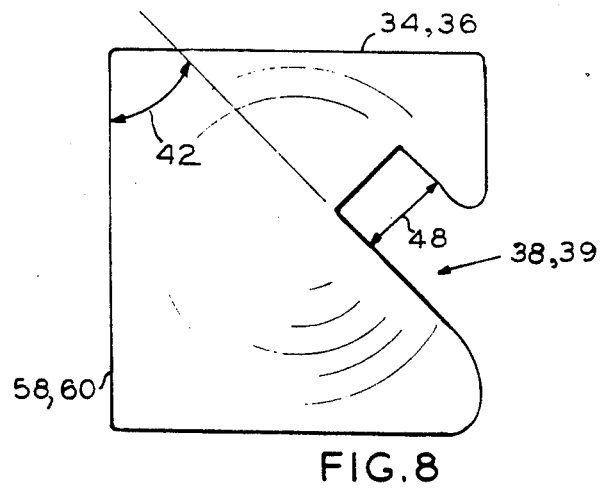
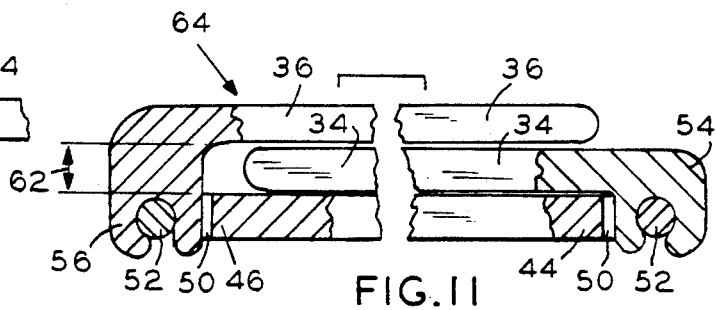
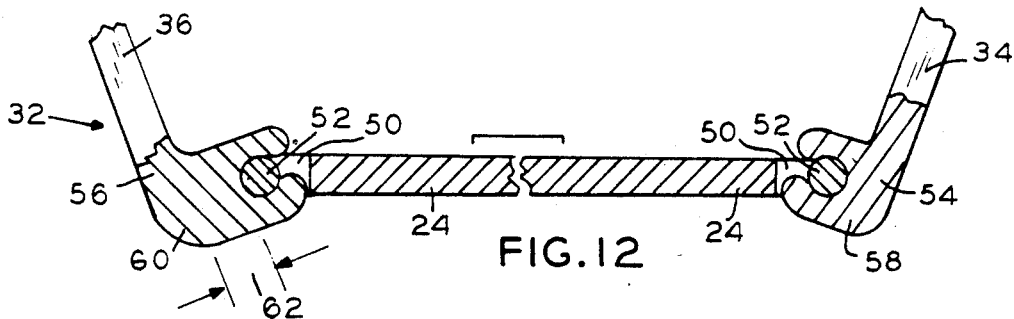
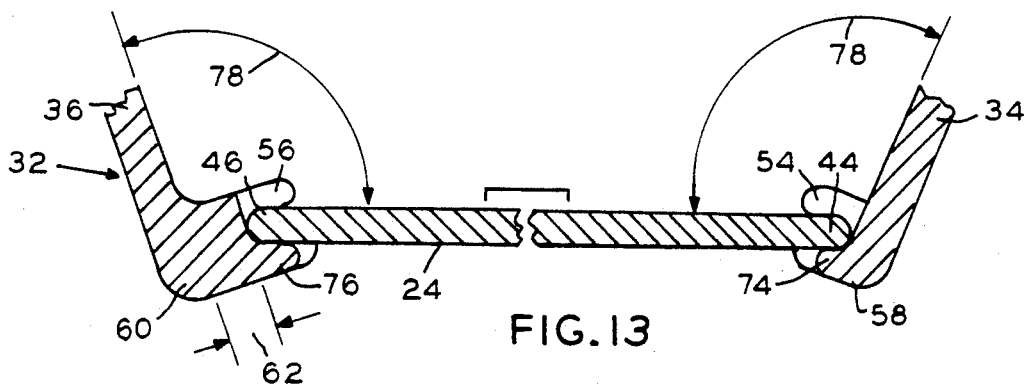

TRAILER HITCH ALIGNMENT DEVICE

BACKGROUND OF THE INVENTION

1. Field of the Invention

The invention involves a trailer hitch alignment device, and, more particularly, a trailer hitch alignment device using a mirror which mounts on the tailgate of the towing vehicle, the device folding to a compact size for easy storage with the folded sides protecting the mirror surface.

2. Description of the Prior Art

Various apparatus have been designed to facilitate trailer hitch connection, including mirrors mounted to permit direct visual observation of the alignment of the trailer tongue with the ball of a trailer hitch. U.S. Pat. Nos. 3,332,731; 3,524,701; 3,858,966; and 4,163,606 all disclose apparatus where a mirror is mounted, with varying degrees of complexity and permanency, on the trailer itself. U.S. Pat. No. 4,552,376 discloses a trailer hitch lamp guide where a lamp mounted on the tongue of the trailer shines upon a translucent target member mounted on the towing vehicle, thereby indicating their relative positions. U.S. Pat. No. 4,905,376 discloses a hitch viewing mirror assembly which detachably mounts on the towing vehicle, the mirror being attached either by clamping means upon the tailgate of a pickup truck or a magnetic mount for a passenger car. This apparatus, however, is relatively bulky and does not provide an inherent storage configuration nor protection against mirror damage when the unit is not in use. In trailer use, it is highly desirable that equipment be easily storable and transportable, taking up the minimum space possible, and being constructed to withstand rough treatment. It is particularly important, in trailer hitch alignment devices using mirrors, that the mirror surfaces be protected.

What is needed is a tailgate mirror device to facilitate trailer hitch alignment by direct visual observation which:

a. mounts directly upon the tailgate of a pickup truck or other towing vehicle, without clamping or other additional attachment means and without readjustment of the mirror;

b. folds conveniently for storage into a compact package;

c. protects the convex mirror during storage; and d. is simple to use and inexpensive to manufacture.

SUMMARY OF THE INVENTION

The present invention involves a trailer hitch alignment device which has been designed to meet the aforementioned need. The trailer hitch alignment device includes a mirror which, when unfolded, is directly mounted upon the tailgate of a pickup truck or other towing vehicle, and when folded provides a very compact package where the mirror is protected from damage and from dirt and dust.

Accordingly, the trailer hitch alignment device, in the preferred embodiment, includes a base member upon which a convex mirror surface is formed or attached. A first side member is hingedly attached to a first edge of the base member so that it pivots between a closed position proximate to the convex mirror surface and an open position at an obtuse angle from the base member. The first side member has an inner surface formed in a concave shape so as to embrace the curvature of the convex mirror surface without contact when in the closed position. A second side member is hingedly attached to a second edge which opposes the first edge of the base member, so as to permit pivotal movement between an obtuse angle from the base member in the open position, and a closed position adjacent the outer surface of the closed first side member. Thus, when the first and second side members are both in the closed position, they combine to protect the mirror surface of the base member. The first side member and the second side member each have an angled slot formed in an edge opposing their hinged edge. The slots are substantially reflections of each other and are disposed at an angle to the hinge edge and thus to the base member and its mirrored surface. With the side members in the open position, the angled slots are aligned to readily engage the top edge of a closed vehicular tailgate so as to support the trailer hitch alignment device in a position which is oriented to permit the driver of the towing vehicle to observe, by means of the mirror surface, the relative alignment of a ball hitch to the coupling of the towed vehicle. In the open position, the preferred obtuse angle between the first and second side members and the base member ranges from 100- to 105-degrees, with a stop being formed upon the side members adjacent to the hinges to prevent further opening. A preferred size of the trailer hitch alignment device is approximately $9\frac{3}{4}$-×9-×1-inch in the folded position, which protectively houses a convex mirror surface with a 9-inch diameter and a $\frac{3}{8}$-inch crown.

BRIEF DESCRIPTION OF THE DRAWINGS

FIG. 1 illustrates a perspective view of the trailer hitch alignment device mounted on the tailgate of a pickup truck, in the open position, as used in alignment of the ball hitch to the coupling of a trailer tongue.

FIG. 2 illustrates a side elevation view in partial cross section of the trailer hitch alignment device as mounted in FIG. 1.

FIG. 3 illustrates an elevation view of the back side of the trailer hitch alignment device in open position.

FIG. 4 illustrates an elevation view of the mirrored front side of the trailer hitch alignment device in open position.

FIG. 5 illustrates a partial cross section view of the trailer hitch alignment device in open position as seen at line 5—5 of FIG. 4.

FIG. 6 illustrates an elevation view of the front side of the trailer hitch alignment device in closed position for storage and transport.

FIG. 7 illustrates a side elevation view of the trailer hitch alignment device in partial cross section as seen at line 7—7 of FIG. 6.

FIG. 8 illustrates an enlarged view of a tailgate-engaging slot of the trailer hitch alignment device.

FIG. 9 illustrates an enlarged view of the hinge aperture and pintle as formed on the base member.

FIG. 10 illustrates a cross sectional view of the hinge aperture and pintle as seen at line 10—10 of FIG. 9.

FIG. 11 illustrates a cross sectional view of the hinge engagement in the closed position as seen at line 11—11 of FIG. 6.

FIG. 12 illustrates a cross sectional view of the hinge engagement in the open position as seen at line 12—12 of FIG. 4.

FIG. 13 illustrates a cross sectional view of the side member stop engagement in the open position as seen at line 13—13 of FIG. 4.

DESCRIPTION OF THE PREFERRED EMBODIMENT

Turning now to the drawings, there is shown in FIGS. 1 and 2 the preferred embodiment of the trailer hitch alignment device 10 mounted on the tailgate 12 of a pickup truck 14 as used in the alignment of the trailer hitch ball 16 to the coupling 18 located on the tongue 20 of a towed vehicle, a trailer 22 as illustrated.

The trailer hitch alignment device 10 includes a base member 24, essentially square in shape, upon which a mirror surface 26 is formed or attached. In the preferred embodiment, the mirror surface 26 is convex in shape so as to expand the extent of the area about the hitch ball 16 which may be viewed from the cab 28 of the pickup truck 14. The base member 24 may be formed with its mirror-supporting surface 30 in a convex shape so that the mirror surface 26 itself is merely coated upon that mirror supporting surface 30.

The base member 24 is supported upon the tailgate 12 in a mounted or open position 32 by two side members 34 and 36 which are formed, respectively, with an angled slot 38 and 39. In the open position 32, the slots 38, 39 engage the top 40 of the tailgate 12 so as to position the base member 24 with its mirror surface 26 at an angle 42 to the tailgate 12 with its top edge 43 tilted forward, as best seen in FIG. 2. This permits viewing from the cab 28 of the pickup truck 14 of both the trailer hitch ball 16 and a nearby coupling 18 on the tongue 20 of a trailer 22 to be towed. The slots 38, 39 are substantially reflections of each other and are formed in the side members 34, 36 opposing the hinge edges 58, 60 respectively. The angle 42 of the slot, as shown in FIGS. 2 and 8, desirably is in a range of 45- to 60-degrees with a preferred angle of approximately 50-degrees. A slot 38, 39 having a width 48 varying between 3- to 3⅛- inches accommodates most tailgates 12 on pickup trucks 14 and also allows the trailer hitch alignment device 10 to be mounted on the partially raised rear window of a vehicle so equipped (not shown).

The base member 24 is formed at its sides 44 and 46 with hinge means which, in the preferred embodiment include a slot 50, and a pintle 52 which is formed as a bearing surface, for the partially encircling hinge members 54 and 56 which are formed on the hinge edges 58 and 60 of side members 34 and 36, respectively. The hinge members 54 for the side member 34 and the hinge members 56 for side member 36 are formed differently, with hinge member 56 being deeper with an offset 62, so that, in the folded or closed position 64, with the side member 34 lying closely on top of the base member 24, the side member 36 will, in turn, lie closely on top of the side member 34. The folded side members 34 and 36 thus provide a complete layer of protection to the mirror surface 26 as well as a compact folded package 66 when the trailer hitch alignment device 10 is not in use.

Since the base member 24 preferably has a convex mirror surface 26, in order to provide a protective yet compact folded package 66, the side member 34 has an inner surface 68 which is appropriately concave in shape so as to match the convexity of the mirror surface 26 while providing a uniform gap 70 therebetween of approximately 1/16-inch. The side member 36 fits directly on top of side member 34, there being no objection to contact between the folded side members 34 and 36. If the outside surface 72 of side member 34 is convex, corresponding to a member of uniform thickness with a concave inner surface 68, it is preferred that the inner surface 73 of side member 36 also be formed with a corresponding concave shape.

The trailer hitch alignment device 10 as a folded package 66 is best seen overall at FIGS. 6 and 7 where side member 34 is folded upon base member 24 and side member 36 is folded, in turn, atop side member 34. In FIG. 6, the slot 38 of side member 34 is shown in dashed lines beneath the folded side member 36.

It has been found advantageous, in the pivoting of the side members 34, 36 upon the sides 44, 46 of the base member 24, to include stops 74, 76 which limit the obtuse angle 78 to which the side members 34 and 36 may be opened to approximately 100- to 105-degrees. This resulting divergent positioning of the side members 34 and 36, best seen in FIG. 5, allows an increased lateral viewing area. Stop 74 extends along hinge edge 58 between the hinge members 54 on side member 34, and stop 76 extends along hinge edge 60 between the hinge members 56 on side member 36. When the side member 34 is fully opened, the stop 74 will abut beneath side 44 of the base member 24, thereby denying further increase in angle 78. Similarly, stop 76, extending from offset 62, will abut beneath the side 46 of the base member 24, preventing further opening of side member 36. Details of the hinging and the stop design are seen in FIGS. 9-13.

It is thought that the trailer hitch alignment device 10 of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:
1. A trailer hitch alignment device, comprising:
   a. a base member, having a first side edge and an opposing second side edge;
   b. a mirror surface formed on said base member;
   c. a first side member, having a hinge edge;
   d. means for pivotally attaching the hinge edge of said first side member to said first edge of said base member to permit rotational movement of said first side member between a closed position proximate said mirror surface and an open position at an angle from said base member;
   e. said first side member having a slot formed in an edge opposing said hinge edge of said first side member;
   f. a second side member, having a hinge edge;
   g. means for pivotally attaching the hinge edge of said second side member to said second edge of said base member to permit rotational movement of said second side member between a closed position adjacent to said first side member in a closed position and an open position at an angle from said base member;
   h. said second side member having a slot formed in an edge opposing said hinge edge of said second side member, said slot being substantially a reflection of said slot formed in said first side member;
   i. said slots formed in said first and second side members being aligned, in the open position, to permit ready engagement of a vehicular tailgate member along a top edge thereof, and being disposed at an angle relative to said hinge edge so as to support the trailer hitch alignment device in a top-forward position oriented to permit a driver to observe, by means of said mirror surface, the relative alignment of a hitch ball to a coupling of a towed vehicle.

2. The trailer hitch alignment device, as recited in claim 1, wherein
   a. said mirror surface formed upon said base member is convex in shape;
   b. said first side member has an inner surface formed in a concave shape so as to embrace without contact the curvature of said convex mirror surface when said first side member is in said closed position.

3. The trailer hitch alignment device, as recited in claim 2, wherein:
   a. said first side member has an outer surface, opposing said inner surface, which is formed in a convex shape, said first side member being of substantially uniform thickness;
   b. said second side member has an inner surface formed in a concave shape so as to lay adjacent to said first side member when said first and second side members are both in said closed position.

4. The trailer hitch alignment device, as recited in claim 1, wherein the angle between said first side member and said base member and the angle between said second side member and said base member are obtuse and substantially equal.

5. The trailer hitch alignment device, as recited in claim 4, wherein said obtuse angle between said first side member and said base member, and between said second side member and said base member is within a range of 100- to 105-degrees.

6. The trailer hitch alignment device, as recited in claim 1, wherein the angle of the slots relative to said hinge edges of said first side member and said second side member is within a range of forty-five to sixty degrees.

7. The trailer hitch alignment device, as recited in claim 6, wherein the angle of the slots relative to said hinge edges of said first side member and second side member is approximately fifty degrees.

8. The trailer hitch alignment device, as recited in claim 2, wherein said convex mirror surface has a diameter of approximately 9-inches and a crown height of approximately ⅜-inch.

9. The trailer hitch alignment device, as recited in claim 1, wherein additionally there are means of limiting the extent of rotational movement of the first side member and the second side member to the open position.

10. The trailer hitch alignment device, as recited in claim 9, wherein the means for limiting the extent of rotational movement of the first side member and the second side member to the open position includes a stop in the form of a protrusion lying along said hinge edges of said first and second side members, which is formed to abut, in the open position, beneath said first and second edges of said base member, respectively, so as to preclude further outward rotation.

* * * * *